US007911669B2

(12) United States Patent
Shimomura

(10) Patent No.: US 7,911,669 B2
(45) Date of Patent: Mar. 22, 2011

(54) OPTICAL SCANNING DEVICE AND IMAGE FORMING APPARATUS USING THE SAME

(75) Inventor: Hidekazu Shimomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 546 days.

(21) Appl. No.: 12/028,010

(22) Filed: Feb. 7, 2008

(65) Prior Publication Data

US 2008/0192324 A1   Aug. 14, 2008

(30) Foreign Application Priority Data

Feb. 14, 2007   (JP) ................................. 2007-033462

(51) Int. Cl.
G02B 26/08   (2006.01)

(52) U.S. Cl. ............... 359/213.1; 359/214.1; 359/215.1; 347/259

(58) Field of Classification Search .... 359/199.1–200.5, 359/213.1–215.1, 224.1–225.1, 226.2; 347/241–244, 347/256–260
See application file for complete search history.

(56) References Cited

U.S. PATENT DOCUMENTS

| 6,840,642 | B2 * | 1/2005 | Ishikawa et al. | ............ | 359/872 |
| 7,068,406 | B2 | 6/2006 | Shimomura | ................. | 359/196 |
| 7,190,498 | B2 | 3/2007 | Shimomura | ................. | 359/205 |
| 2005/0243396 | A1 | 11/2005 | Fujii et al. | .................... | 359/224 |

FOREIGN PATENT DOCUMENTS

JP   2005-308863   11/2005

OTHER PUBLICATIONS

European Search Report dated Apr. 6, 2009 from corresponding European Application No. 08002640.4.
European Search Report dated May 7, 2008 from corresponding European Application No. 08002640.4.

* cited by examiner

Primary Examiner — James Phan
(74) Attorney, Agent, or Firm — Fitzpatrick, Cella, Harper & Scinto

(57) ABSTRACT

An optical scanning device includes a condensing optical system for collecting a light beam emitted from light source means, a deflecting system for scanningly deflecting the light beam collected by the condensing optical system, and an imaging optical system configured to image the light beam scanningly deflected by the deflecting means, on a surface to be scanned, the deflecting means having a deflecting surface reciprocally movable within a main-scan sectional plane to scanningly deflect the light beam from the condensing optical system, wherein, when the deflecting surface reciprocally moves within the main-scan sectional plane, the deflecting surface receives an angular acceleration which is able to cause deformation being asymmetric with respect to a sub-scan direction, and wherein the condensing optical system collects the light beam from the light source means to a region of the deflecting surface which is at a side of a central line of the deflecting surface with respect to the sub-scan direction where an amount of asymmetric deformation of the deflecting surface in the sub-scan direction is smaller than that at the other side.

7 Claims, 13 Drawing Sheets

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is particularly suitable for an image forming apparatus such as a laser beam printer, a digital copying machine or a multifunction printer having an electrophotographic process.

Conventionally, various proposals have been made in regard to optical scanning devices using an optical deflector (resonance type optical deflector) as deflecting means which is configured to perform reciprocal motion (e.g., Patent Document No. 1).

As compared with optical scanning devices using a rotary polygonal mirror (polygon mirror) as an optical deflector, the optical scanning devices using a resonance-type optical deflector have advantageous features that the optical deflector itself can be made very small in size and the electric power consumption is low.

Furthermore, the optical deflector of resonance type which comprises Si monocrystal produced through semiconductor processes has an advantage that there is theoretically no metal fatigue and hence the durability is very good.

FIG. 20 is a schematic diagram of a main portion of an optical scanning device using a conventional resonance type optical deflector.

In FIG. 20, the light beam width of a diverging light from light source means 91 is restricted by a stop 92 to obtain a predetermined spot diameter. After this, the light beam is transformed into a parallel light beam by a collimator lens 93.

Denoted at 94 is a cylindrical lens having a refracting power in the sub-scan direction. Within the main-scan sectional plane, the parallel light beam incident on the cylindrical lens 94 goes out of the lens without being unchanged.

Furthermore, within the sub-scan sectional plane, the light beam is converged and focused as a line image on the deflecting surface 501a of the optical deflector 95 which moves reciprocally.

The optical deflector 95 used here is shown in FIG. 21.

In FIG. 21, the optical deflector 95 comprises a movable plate (hereinafter, "first movable plate") 501, two movable plates (hereinafter, "second movable plate") 504 provided above and below (along Z-direction or sub-scan direction) the first movable plate 501, and a mechanical grounding and supporting member 505. It furthermore comprises a torsion spring 508 which provides elastic support for these elements.

All these components are torsionally oscillated around an oscillation axis A by driving means 506.

The driving means 506 comprises a fixed magnetic coil. In response to an arbitrary electric current from a drive control means 507, the driving means produces oscillation based on the electromagnetic force caused with a magnet 503 mounted on the second movable plate 504.

Furthermore, the first movable plate 501 has a deflecting surface 501a for deflecting light, and it scanningly deflects the light beam from the light source means 91 based on the torsional oscillation of the first movable plate 501 and the second movable plate 504.

The resonance type optical deflector 95 illustrated in FIG. 21 is a dual-freedom oscillation system which is configured, when driven by superimposing a frequency twofold the reference frequency upon the reference frequency, to accomplish scanning deflection having a wider constant angular-speed region as compared with a sinusoidal vibration type.

[Patent Document]
No. 1: Japanese Laid-Open Patent Application No. 2005-308863

The optical scanning devices with a resonance type optical deflector 95 having been proposed conventionally involve some inconveniences to be described below.

Generally, in the optical deflector 95 which requires high-speed operation, the deflecting surface 501a thereof receives a large angular acceleration due to torsional oscillation within a predetermined angular range.

Thus, the deflecting surface 501a receives an inertial force by the self-weight at the time of driving, and the deflecting surface 501a flexes largely.

Here, if the deflecting surface 501a deforms due to dynamic flexure, the light beam reflected by the deflecting surface 501a will produce wavefront aberration (comatic aberration) of a quantity twofold the amount of deformation. This will adversely affect the imaging spot produced on the surface of a photosensitive drum 8.

The wavefront aberration (comatic aberration) producing by dynamic flexure may be corrected by using an imaging optical system LB which may be provided between the optical deflector 5 and the photosensitive drum surface 8.

However, the quantity of correction based on the imaging optical system LB is limited. If the quantity of flexure itself is too large, the correction will be insufficient and the image quality will be degraded.

Furthermore, as shown in FIG. 21, it has recently been found that local deformation occurs around portions (near B1 and B2) where the first movable plate 501 is supported by the torsion spring 508.

It is very difficult to correct wavefront aberration producing by such local deformation, through the imaging optical system LB.

SUMMARY OF THE INVENTION

The present invention provides a small-size optical scanning device by which deterioration of the wavefront aberration due to dynamic flexure of the deflecting surface of a resonance type optical deflector can be reduced, and an image forming apparatus having such optical scanning device.

In accordance with an aspect of the present invention, there is provided an optical scanning device, comprising: a condensing optical system configured to collect a light beam emitted from light source means; deflecting means configured to scanningly deflect the light beam collected by said condensing optical system; and an imaging optical system configured to image the light beam scanningly deflected by said deflecting means, on a surface to be scanned; wherein said deflecting means has a deflecting surface configured to reciprocally move within a main-scan sectional plane and to scanningly deflect the light beam from said condensing optical system, wherein, when said deflecting surface reciprocally moves within the main-scan sectional plane, said deflecting surface receives an angular acceleration which is able to cause deformation thereof being asymmetric with respect to a sub-scan direction, and wherein said condensing optical system is configured to collect the light beam from said light source means to a region of said deflecting surface which region is at a side of a central line of said deflecting surface with respect to the sub-scan direction where an amount of asymmetric deformation of said deflecting surface in the sub-scan direction is smaller than that at the other side.

In one preferred form of this aspect of the present invention, the deflecting surface of the deflecting means is supported by a supporting means only at one side in the sub-scan direction, and wherein the light beam collected by the condensing optical system is collected to a region of the deflecting surface at a side of the central line of the deflecting surface in the sub-scan direction which side is opposite to the side where the deflecting surface is supported by the supporting means.

Furthermore, the condensing optical system may be configured to collect the light beam from the light source means to form a focal line on the deflecting surface, and, when an angle defined between a direction of the focal line of the light beam and a main-scan direction passing through a center of the deflecting surface is denoted by α (deg.), a relation $|\alpha| \leq 1$ (deg.) may be satisfied. The light beam collected by the condensing optical system, when the same is projected in the main-scan sectional plane, may be incident on the deflecting surface from an optical axis direction of the imaging optical system, and the light beam collected by the condensing optical system may be incident within a sub-scan sectional plane at a finite angle with respect to an optical axis of the imaging optical system. The deflecting means may include a movable plate having the deflecting surface, and the movable plate may have a thickness not less than 100 μm and not greater than 500 μm. The deflecting surface of the deflecting means may be driven while a frequency n-fold a reference frequency is superimposed on the reference frequency, where n is an integer.

In accordance with another aspect of the present invention, there is provided an optical scanning device, comprising: a condensing optical system configured to collect a light beam emitted from light source means; deflecting means configured to scanningly deflect the light beam collected by said condensing optical system; and an imaging optical system configured to image the light beam scanningly deflected by said deflecting means, on a surface to be scanned; wherein said deflecting means has a deflecting surface configured to reciprocally move within a main-scan sectional plane and to scanningly deflect the light beam from said condensing optical system, wherein said deflecting surface is supported by a supporting member at both sides with respect to a sub-scan direction, and wherein said condensing optical system is configured to collect the light beam from said light source means to a region of said deflecting surface which region is within a range of 0.25×H in the sub-scan direction from a central line of said deflecting surface with respect to the sub-scan direction, where a width of said deflecting surface in the sub-scan direction is denoted by H (μm).

In one preferred form of this aspect of the present invention, the condensing optical system is configured to collect the light beam from the light source means to form a focal line on the deflecting surface, and, when an angle defined between a direction of the focal line of the light beam and a main-scan direction passing through a center of the deflecting surface is denoted by α (deg.), a relation $|\alpha| \leq 1$ (deg.) is satisfied.

Furthermore, the light beam collected by the condensing optical system, when the same is projected in the main-scan sectional plane, may be incident on the deflecting surface from an optical axis direction of the imaging optical system, and the light beam collected by the condensing optical system may be incident in a sub-scan sectional plane at a finite angle with respect to an optical axis of the imaging optical system. The deflecting means may include a movable plate having the deflecting surface, and the movable plate may have a thickness not less than 100 μm and not greater than 500 μm. The deflecting surface of the deflecting means may be driven while a frequency n-fold a reference frequency is superimposed on the reference frequency, where n is an integer.

In accordance with a further aspect of the present invention, there is provided an image forming apparatus, comprising: an optical scanning device as recited above; a photosensitive member disposed at a surface to be scanned; a developing device for developing an electrostatic latent image formed on said photosensitive member with a light beam scanningly deflected by said optical scanning device, to produce a toner image; a transferring device for transferring the developed toner image onto a transfer material; and a fixing device for fixing the transferred toner image, on the transfer material.

In accordance with a yet further aspect of the present invention, there is provided an image forming apparatus, comprising: an optical scanning device as recited above; and a printer controller for converting code data supplied from an outside machine into an imagewise signal and for inputting the imagewise signal into said optical scanning device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
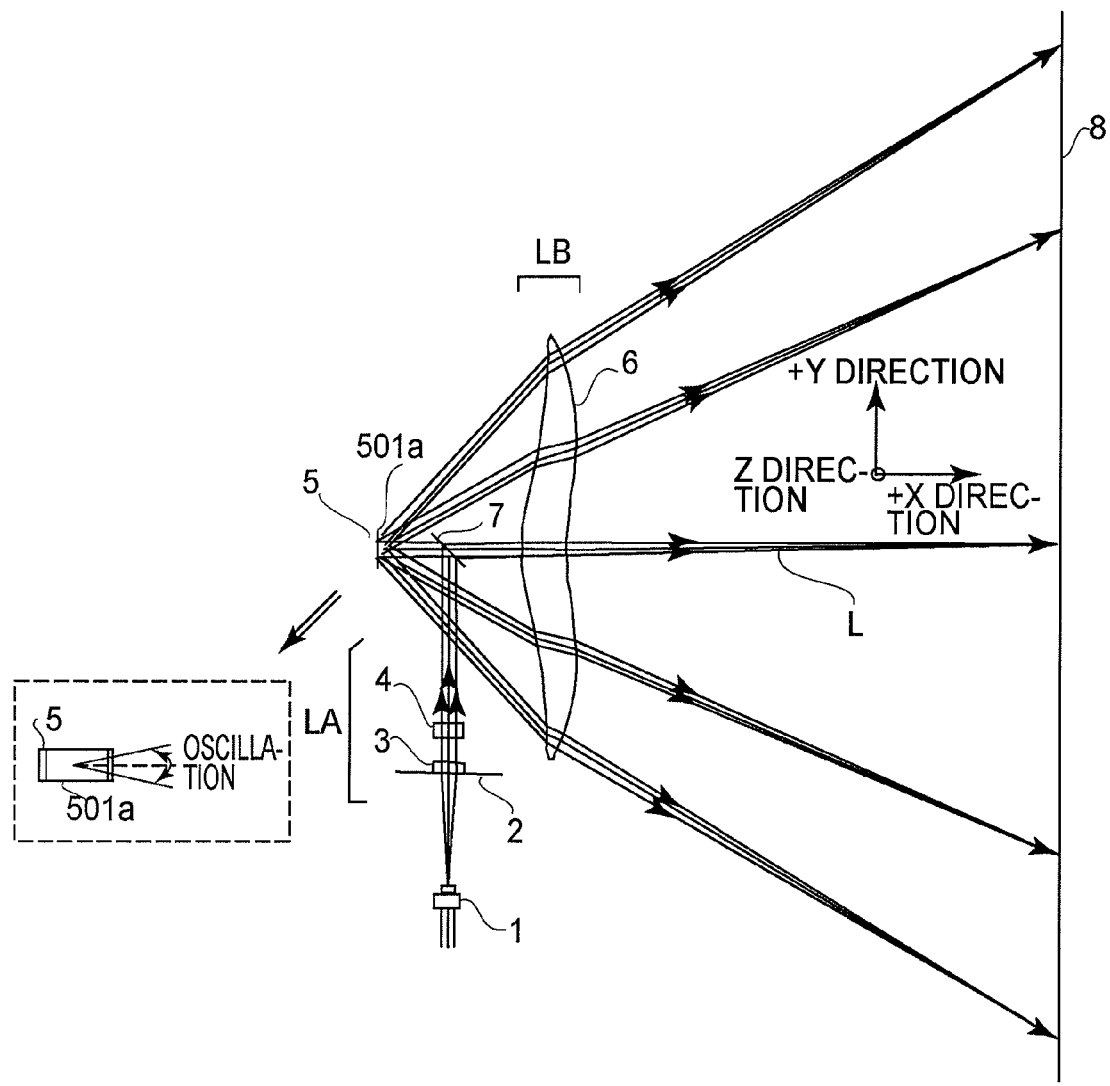
FIG. 1 is a main-scan sectional view of an optical scanning device according to a first embodiment of the present invention.
Figure 2:
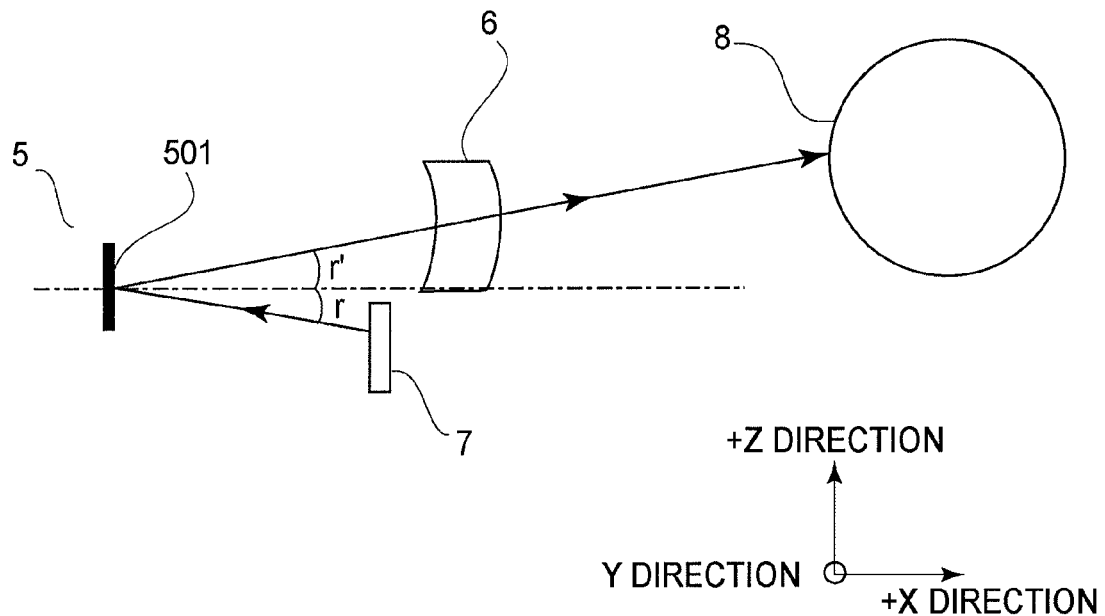
FIG. 2 is a sub-scan sectional view of the optical scanning device according to the first embodiment of the present invention.

FIG. 1 a sectional view (main-scan sectional view), in the main-scan direction, of a main portion of a first embodiment of the present invention. FIG. 2 is a sectional view (sub-scan sectional view), in the sub-scan direction, of a main portion of the first embodiment of the present invention.

In the following description, the term "main-scan direction" refers to a direction (Y direction) which is perpendicular to the oscillation axis of deflecting means and the optical axis (X direction) of an imaging optical system (i.e. the direction in which the light beam is scanningly deflected (scanningly reflected) by the deflecting means).

The term "sub-scan direction" refers to a direction (Z direction) which is parallel to the oscillation axis of the deflecting means.

The term "main-scan section" refers to a plane which contains the main-scan direction and the optical axis of the imaging optical system.

The term "sub-scan section" refers to a section which is perpendicular to main-scan section.

Denoted in the diagram at 1 is light source means, and it comprises a semiconductor laser. Denoted at 2 is an aperture stop, and it restricts the light beam (light quantity) passing therethrough.

Denoted at 3 is a condenser lens (a collimator lens), and it functions to transform a divergent light beam emitted from the light source means 1 into a parallel light beam.

Denoted at 4 is a cylindrical lens, and it has a refracting power only in the sub-scan direction (sub-scan section). The cylindrical lens 4 functions to image the light beam passed through the collimator lens 3, within sub-scan section, into a line image (focal line) upon the deflecting surface 501*a* of an optical deflector 5 to be described below.

It should be noted that the collimator lens 3 and the cylindrical lens 4 may be replaced by a single optical element (anamorphic lens).

Denoted at 7 is a reflecting mirror which reflects the light beam toward the optical deflector 5 side. Here, the aperture stop 2, collimator lens 3, cylindrical lens 4 and reflecting mirror 7 are components of a condensing optical system (input optical system) LA.

Denoted at 5 is an optical deflector of resonance type as deflecting means, and it comprises a galvanometer mirror (oscillating mirror).

The optical deflector 5 has a deflecting surface (deflective reflection surface) 501*a* which moves reciprocally to deflectively reflect the light beam.

When the deflecting surface 501*a* moves reciprocally, an angular acceleration which may cause asymmetric deformation thereof with respect to the sub-scan direction is applied thereto.

The condensing optical system LA functions to collect the light beam from the light source means 1 to form a focal line on the deflecting surface.

Denoted at LB is an imaging optical system having an fθ characteristic, and it is comprised of a single imaging lens (fθ lens) 6 made of a plastic material.

The imaging optical system LB serves to image the light beam deflected by the optical deflector 5, on the surface 8 to be scanned (photosensitive member surface). Also with respect to the sub-scan section, it functions to provide a conjugate relationship between the deflecting surface 501*a* and the photosensitive drum surface 8, to thereby perform surface tilt correction.

Denoted at 8 is a photosensitive drum surface which is the surface to be scanned.

In the present embodiment, the divergent light beam from the semiconductor laser 1 being optically modulated in accordance with imagewise information, goes through the aperture stop 2 by which the light quantity is restricted. The light beam is then transformed into a parallel light beam by means of the collimator lens 3, and then it is incident on the cylindrical lens 4.

Within the main-scan section, the light passing through this cylindrical lens 4 is incident on the deflecting surface 501*a* via the reflecting mirror 7, from the center of the deflection angle of the optical deflector 5 (front incidence).

More specifically, the light beam from the condensing optical system LA, when the same is projected within the main-scan section, is incident on the deflecting surface 501*a* from the optical axis direction of the imaging optical system LB (oblique incidence optical system).

Furthermore, within the sub-scan section, the light beam is converged and incident on the deflecting surface 501*a* via the reflecting mirror 7, with a certain angle (γ=3 deg.) with respect to the sub-scan direction (oblique incidence).

More specifically, in the sub-scan section the light beam is incident at a finite angle with respect to the optical axis L of the imaging optical system LB.

Then, the light beam deflectively reflected by the deflecting surface 501*a* of the optical deflector 5 is directed onto the photosensitive drum surface 8 through the imaging optical system 6. By reciprocating the deflecting surface 501*a* of the optical deflector 5 in the main-scan section, the photosensitive drum surface 8 is optically scanned in a predetermined direction (main-scan direction).

With this procedure, image recording is carried out on the photosensitive drum surface 8 as a recording medium.

Generally, in the case of an optical deflector having a plurality of deflecting surfaces as of a rotary polygonal mirror (polygon mirror), these deflection surfaces have different tilt angles in the sub-scan direction. Therefore, usually a surface-tilt correcting optical system is adopted.

In the case of an optical deflector of resonance type, on the other hand, since there is only one deflecting surface, it is not necessary to take into account the difference of surface tilt amount of plural deflecting surfaces.

However, it is still preferable to take into account that the tilt amount in the sub-scan direction is different depending on the deflection angle, this being attributable to the installation precision error of the magnet 503 shown in FIG. 3, to be described later.

Therefore, in order to assure that the beam spot position on the photosensitive drum surface 8 exactly follows a straight line from the start of scan to the end of scan, the deflecting surface 501a and the photosensitive drum surface 8 should preferably be placed in a conjugate relationship with each other, within the sub-scan section.

Furthermore, generally in resonance type optical deflectors, if the area of the deflecting surface is enlarged, it becomes difficult to attain high-speed oscillation.

When it is used in a laser beam printer or a digital copying machine, the size of the deflecting surface had better be made small as much as possible.

In consideration of this, in the present embodiment as described above, the light beam is incident on the deflecting surface 501a of the resonance type optical deflector 5 from the front of the same (front incidence), from the imaging lens 6 side.

With this front incidence of light as described above, the size (width in the main-scan direction) of the deflecting surface 501a of the resonance type optical deflector 5 can be made smallest, and high-speed oscillation is ensured.

Furthermore, if such incidence method (front incidence method) as described above is used, the light beam being incident on the deflecting surface 501a of the resonance type optical deflector 5 and the light beam being deflectively reflected by the deflecting surface 501a will interfere each other.

In consideration of this, the light beam going to be incident on the deflecting surface 501a should preferably be incident there while keeping a finite angle with respect to the optical axis L of the imaging optical system LB, within the sub-scan section, as described hereinbefore.

More specifically, an oblique incidence angle of γ=3 deg. is given in the sub-scan direction, and the light beam is incident via the reflecting mirror 7 from below in the sub-scan direction (from the above and below with respect to the normal to the deflecting surface 501a, as viewed in the drawing).

Thus, the light beam to be deflectively reflected by the deflecting surface 501a as well is similarly deflectively reflected to the above in the sub-scan direction (to the above and blow with respect to the normal to the deflecting surface 501a, as viewed in the drawing), while defining an angle of γ'=3 deg in the sub-scan direction.

The imaging lens 6 which constitutes the imaging optical system LB is disposed at a predetermined distance upward in the sub-scan direction to ensure that the deflected light beam being deflectively reflected upwardly in the sub-scan direction is incident thereon. Hence, the deflected light beam incident on the imaging lens 6 is imaged on the photosensitive drum 8 as a spot.

The resonance type optical deflector 5 of the present embodiment is driven while superimposing, on the reference frequency, a frequency twofold of the reference frequency. Based on this, deflective scan having a wider constant angular-speed region as compared with sinusoidal oscillation type is accomplished.

If a resonance type optical deflector based on sinusoidal oscillation is used, in order to achieve constant-speed scan of light on the scanned surface, it is necessary to use an imaging lens having an arcsine characteristic to collect the light beam after being deflected.

However, if the scan imaging is done by using such imaging lens having an arcsine characteristic, the spot at the image end portion will expand as compared with that at the image central portion, causing deterioration of the image quality.

In consideration of this, the present embodiment uses a resonance type optical deflector 5 of two-degree-of-freedom system, thereby to widen the constant angular-speed region. This enables use of an imaging lens having an fθ characteristic, which has conventionally been used in polygon mirrors.

Figure 3:
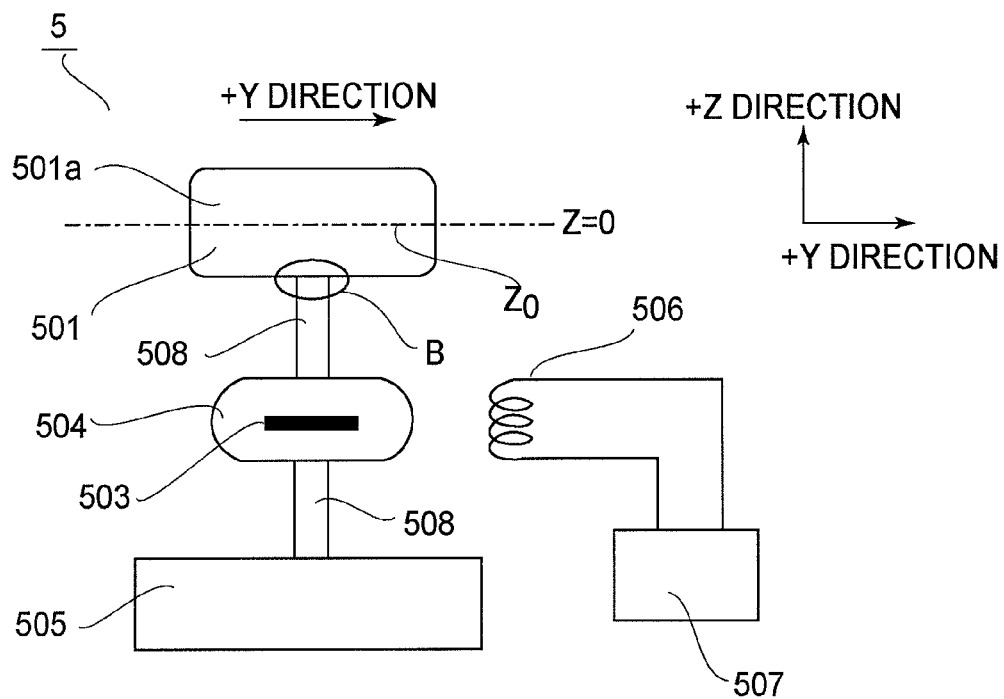
FIG. 3 is a schematic diagram of a main portion of an optical deflector of resonance type according to the first embodiment of the present invention.

FIG. 3 is a schematic diagram of a main portion of a resonance type optical deflector according to the first embodiment of the present invention.

The optical deflector 5 shown in FIG. 3 comprises a movable plate (first movable plate) 501, a movable plate (the second movable plate) 504 provided below the first movable plate 501 in the sub-scan direction (Z-direction), and a mechanical grounding supporting member 505. Furthermore, it comprises a torsion spring 508 as a supporting member for providing elastic support for these components. Denoted at B is the supporting portion.

All these components are torsionally oscillated around an oscillation axis (not shown) by driving means 506.

The driving means 506 comprises a fixed magnetic coil. In response to an arbitrary electric currents from drive control means 507, it produces oscillation based on the electromagnetic force caused with a magnet 503 mounted on the second movable plate 504.

Furthermore, the first movable plate 501 has a deflecting surface 501a for deflecting light and, based on torsional oscillation of the first movable plate 501 and the second movable plate 504, it scanningly deflects the light beam from the light source means 1.

The natural oscillation frequency for driving the optical deflector 5 is $$\omega_1 = 2\pi \times 200 \text{ (Hz)}$$

$$\omega_2 = 2\pi \times 4000 \text{ (Hz)}$$

Namely, $$\omega_2 = 2\omega_1$$

Hereinafter, these oscillation modes will be referred to as "Mode 1" and "Mode 2".

In the resonance type optical deflector 5 of the present embodiment, the drive control means 507 controls the driving means 506 so that the system comprised of the first and second movable plates 501 and 504 and the torsion spring 508 simultaneously oscillates at the reference frequency and a frequency n-fold the reference frequency, where n is an integer.

In doing so, the amplitude and phase of the movable plates at the reference frequency and the n-fold frequency thereof may be changed in various ways, to accomplish a variety of driving manners.

In the present embodiment, the drive control means 507 controls the driving means 506 to ensure that the maximum oscillation amplitude ø$_1$ of the first movable plate 501 in Mode 1 is set as $$\text{ø}_1 = 38.27979 \text{ deg.}$$

and the angular frequency ω$_1$ is set as $$\omega_1 = 2\pi \times 2000s \text{ (Hz)}$$

Furthermore, the maximum oscillation amplitude $\phi_2$ of the second movable plate 504 in Mode 2 is set as $\phi_2=5.32752$ deg.

and the angular frequency $\omega_2$ is set as $\omega_2=2\pi \times 4000s$ (Hz)

Namely, the phases of them have a difference of 180 deg.

The oscillation angle (deflection angle) $\theta_1$ of the first movable plate 501 here is given by $\theta_1=\phi_1 \sin(\omega_1 t)-\phi_2 \sin(\omega_2 t)$ Furthermore, the angular speed $d\theta_1/dt$ and the angular acceleration $d^2\theta_1/dt^2$ of the first movable plate 501 are given by $$\frac{d\theta_1}{dt} = \phi_1 \omega_1 \cos(\omega_1 t) - \phi_2 \omega_2 \cos(\omega_2 t)$$

$$\frac{d^2\theta_1}{dt^2} = -\phi_1 \omega_1^2 \sin(\omega_1 t) + \phi_2 \omega_2^2 \cos(\omega_2 t)$$

Figure 4:
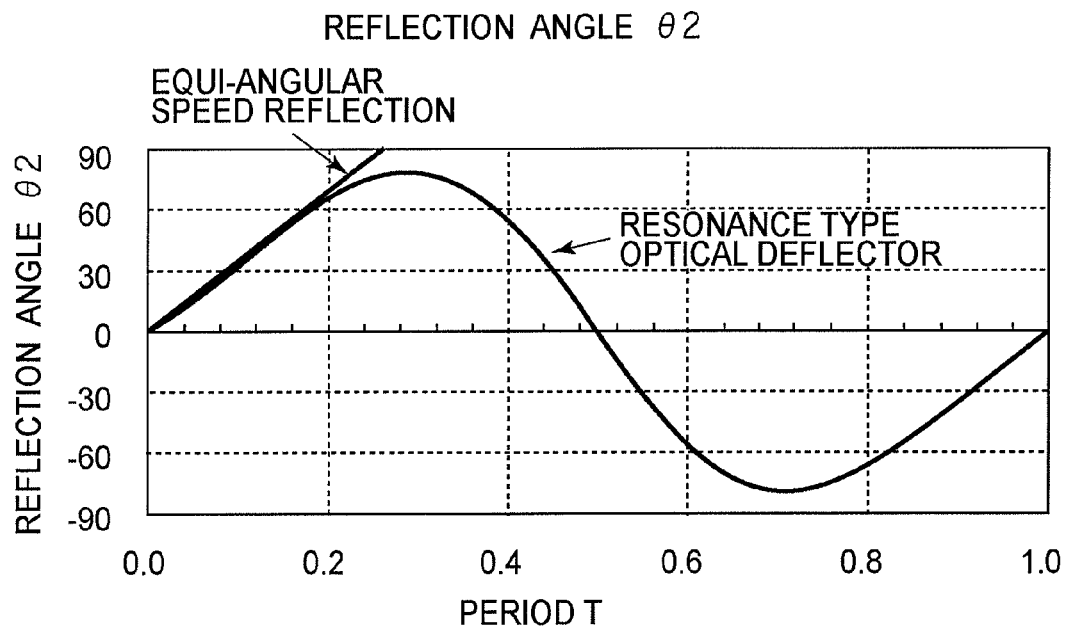
FIG. 4 is a graph illustrating the reflection angle of the resonance type optical deflector according to the first embodiment of the present invention.

FIG. 4 illustrates the oscillation angle (reflection angle) $\theta_2=2\theta_1$ of the scanning light beam by the first movable plate 501 of the resonance type optical deflector 5 of the present embodiment.

In FIG. 4, the axis of abscissas denotes the period T (time) of oscillation, and the axis of ordinate denotes the oscillation angle $\theta_2$ (the unit is degree).

It is seen that, in the present embodiment, by exciting Mode 1 and Mode 2 at the same time, the region where the oscillation angle $\theta_2$ is proportional to time is widened as compared with conventional sinusoidal oscillation.

Figure 5:
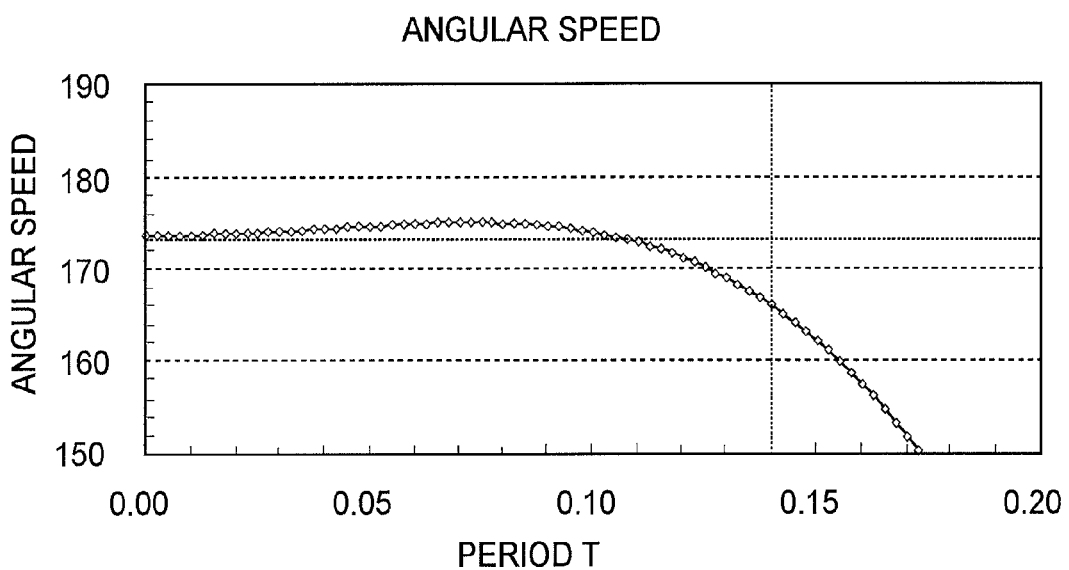
FIG. 5 is a graph illustrating the angular speed of the resonance type optical deflector according to the first embodiment of the present invention.

FIG. 5 is a graph which illustrates the angular speed of the deflection angle of the first movable plate 501. In FIG. 5, the axis of abscissas denotes the period T (time) of oscillation, and the axis of ordinate denotes the angular acceleration. It is seen that the angular acceleration is constant from time 0 to time 0.14T.

In the resonance type optical deflector 5 used in the present embodiment, the thickness of the first movable plate 501 is 200 μm, the width thereof in the main-scan direction (Y-direction) is 3.2 mm, and the width thereof in the sub-scan direction (Z-direction) is 1.1 mm.

Figure 6:
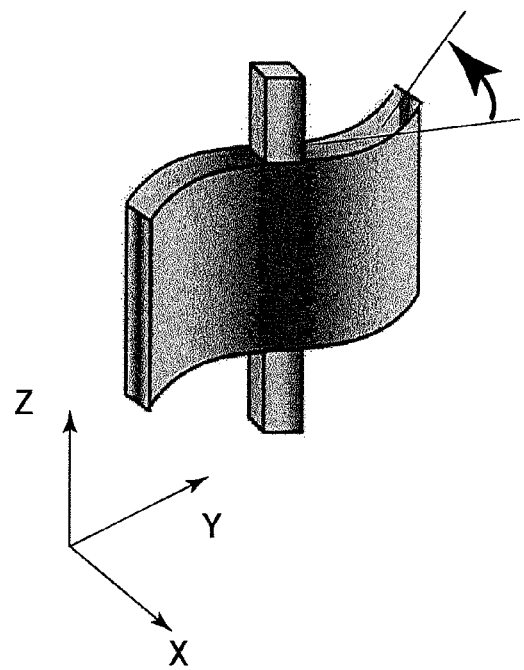
FIG. 6 is a schematic illustration, showing surface deformation of the resonance type optical deflector according to the first embodiment of the present invention.

If such very thin first movable plate 501 is oscillated at high speed, surface deformation (dynamic flexure) as schematically illustrated in FIG. 6 will be produced.

Figure 7:
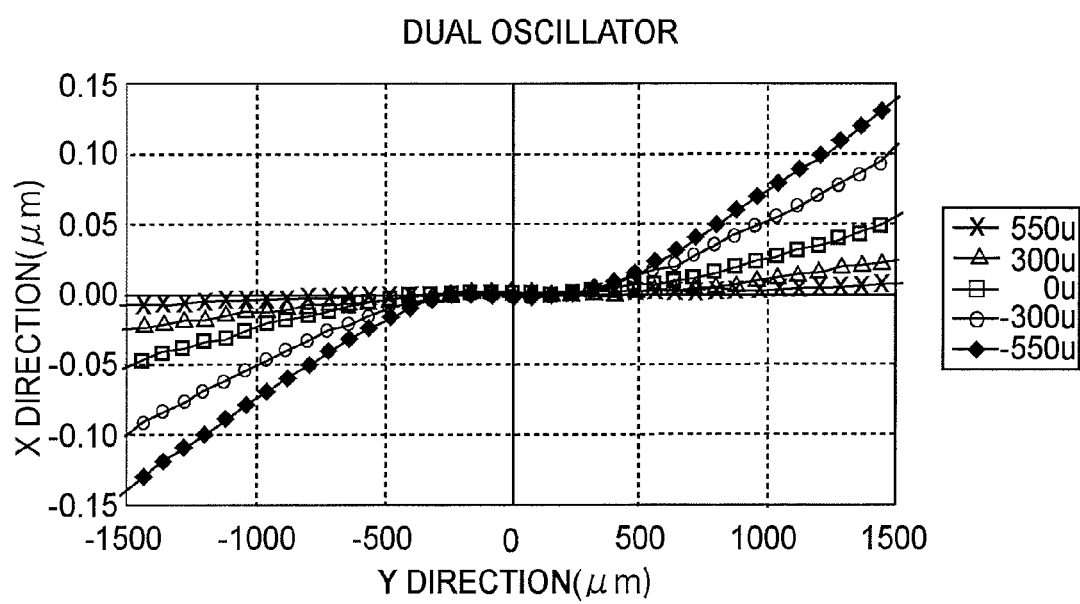
FIG. 7 is a graph showing surface-deformation simulation values of the resonance type optical deflector according to the first embodiment of the present invention.
Figure 8:
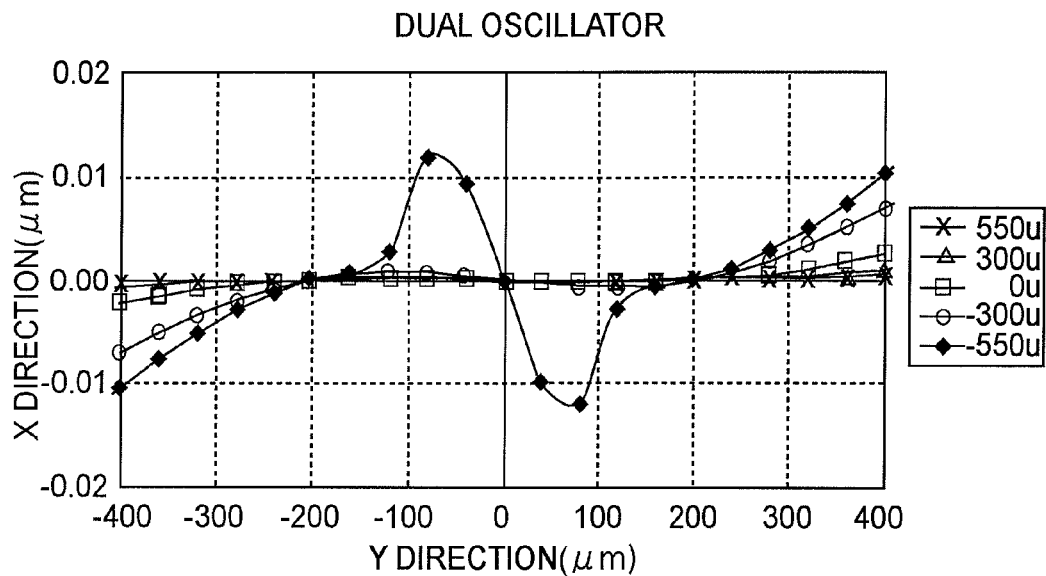
FIG. 8 is a graph enlarged in scale, showing surface-deformation simulation values of the resonance type optical deflector according to the first embodiment of the present invention.

FIG. 7 is a graph showing the amount of surface deformation (quantity of dynamic flexure) of the deflecting surface 501a in the state where the image end portion is being scanned, when the oscillation described above is carried out. The surface deformation was calculated based on the finite element method. FIG. 8 is an enlarged view of the central part of the graph illustrated in FIG. 7.

This graph was prepared by detecting the surface deformations at certain heights of the deflecting surface 501a and by removing surface tilt components, at respective heights, at the central portion in the main-scan direction.

It is seen from this graph that the deformation amount differs largely from position to position in the Z-direction (sub-scan direction).

In FIG. 3, denoted at Z0 is a central line on the deflecting surface in the sub-scan direction, when Z=0.

It is seen that the amount of surface deformation is larger in the region at the side (Z<0, below the central line Z0 shown in FIG. 3) where the deflecting surface 501a is supported by the torsion spring 508, and that the amount of surface deformation is smaller in the region at the other side (Z>0, above the central line Z0 in FIG. 3).

Generally it can be said that the surface deformation is larger at the supported side and it is smaller at the non-supported side.

Furthermore, it is seen that local deformation occurs at the supporting portion (i.e. Z=−550 μm, region B) adjacent the torsion spring 508. If the light beam is reflected by the portion where there is such a local surface deformation, the spot to be imaged on the photosensitive drum surface 8 will be deformed largely, and thus high-quality image formation will be difficult to attain.

Although the thickness of the first movable plate 501 of the present embodiment is 200 μm, in order to reduce dynamic flexure thereof due to the angular acceleration, the thickness may be enlarged.

However, if the first movable plate 501 is thickened, in order to produce resonance oscillation with the same frequency, the length of the torsion spring 508 has to be prolonged.

Therefore, the size itself of the resonance type optical deflector has to be enlarged, and it causes increase in size of the overall optical scanning device.

Furthermore, the number of resonance type optical deflectors which can be produced from a single wafer will be reduced, and the manufacturing efficiency will be degraded.

Furthermore, if the thickness of the first movable plate 501 is made smaller, the size itself of the resonance type optical deflector 5 will be smaller. However, the amount of dynamic flexure described hereinbefore becomes large, and the spot to be imaged on the scanned surface is affected thereby.

In consideration of these, the thickness of the first movable plate 501 should preferably be set in the range not less than 100 μm and not greater than 500 μm.

With regard to optical scanning devices with a resonance type optical deflector 5 having been previously proposed, there has been no discussion about which position on the deflecting surface 501a the light beam should be reflected.

Figure 9:
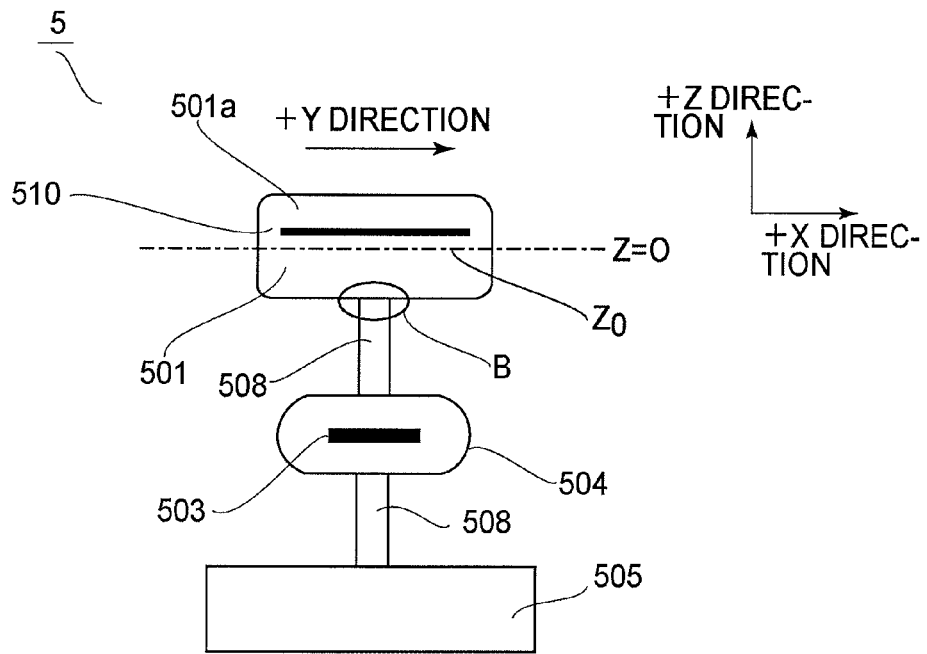
FIG. 9 is a diagram for explaining the positional relationship between the deflecting surface and the focal line, in the first embodiment of the present invention. Focal line

In the present embodiment, as shown in FIG. 9, the upper region (above the central line Z0) where the amount of deformation is smaller is selected, and the focal line 510 is set in that region.

More particularly, the condensing optical system LA collects the light beam emitted from the light source means 1, within range of the deflecting surface 501a in the sub-scan direction, and specifically to the region which is at a side of the central line Z0 (above the central line Z0) with respect to the sub-scan direction, where, of the asymmetric deformation of the deflecting surface 501a in the sub-scan direction, the deformation amount is smaller.

With this arrangement, deterioration of the wavefront aberration (comatic aberration) of the light beam reflected by the deflecting surface 501a is prevented.

Furthermore, if the wavefront aberration due to the surface deformation is going to be corrected by the imaging optical system LB, the difficulty of designing the imaging optical system LB is different between a case using the upper region (region above the central line Z0) having smaller surface deformation and a case using the lower region (region below the central line Z0) having larger surface deformation.

In other words, the optical designing is naturally easier when the upper region having smaller surface deformation is used.

In the first movable plate 501 supported at one side as in the present embodiment, the influence of the surface deformation can be lowered by defining the focal line 510 at a side opposite to the supported side.

Hence, the influence of the surface deformation is lowered by collecting the light beam condensed by the condensing optical system LA to the region of the deflecting surface 501a which region is at a side of the central line A0 in the sub-scan direction, opposite to the side being supported by the supporting member 508.

Furthermore, by doing so, the focal line can be set away from the local surface deformation (at region B shown in FIG. 9).

Furthermore, as will be described later with reference to a second embodiment, in an example wherein the first movable plate 501 is supported at both sides thereof, contrary to the present embodiment, a vertically symmetrical surface deformation will be produced if the resonance type optical deflector uses a movable plate or torsional spring having a vertically asymmetrical shape.

In such case, the focal line may be defined at a side of the central portion of the movable plate with respect to the height direction of the movable plate where deformation is smaller, by which the influence of the surface deformation on the spot can be reduced.

Furthermore, even when the position of the focal line 510 shifts upwardly or downwardly in the height direction (sub-scan direction) due to any environmental variation, the influence on the spot will apparently become smaller by defining the focal line 510 in the region where the surface deformation is smaller.

Figure 10:
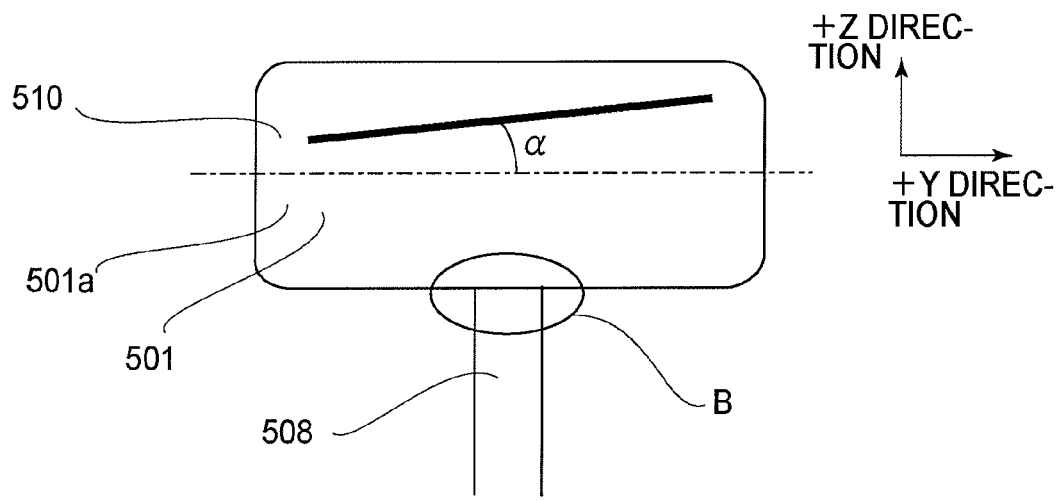
FIG. 10 is a diagram for explaining the relationship between the deflecting surface and the tilt of the focal line, in the first embodiment of the present invention.

Subsequently, if the focal line 510 tilts in the sub-scan direction (Z-direction) as shown in FIG. 10, the surface deformation described with reference to FIG. 7 and FIG. 8 has to be considered while taking into account the difference of the tilt component at the central portion in the main-scan direction.

Figure 11:
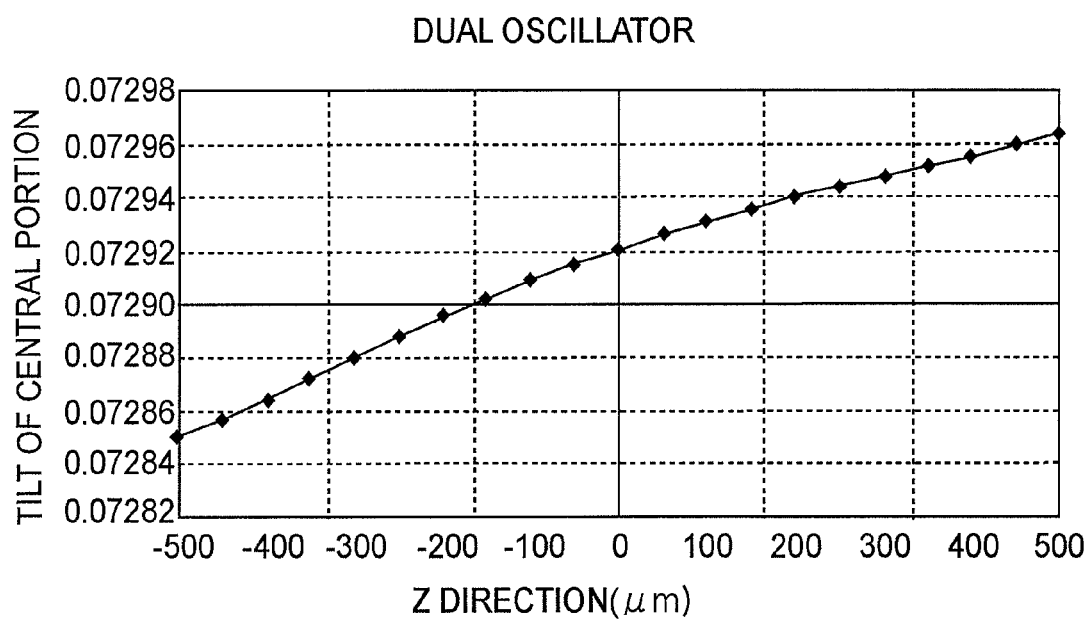
FIG. 11 is a graph illustrating the tilt component in the main-scan central portion, in the first embodiment of the present invention.

FIG. 11 is a graph wherein the position (position in the sub-scan direction) of deflecting surface 501a in the height direction is taken on the axis of abscissas, while the tilt component of the deflecting surface at the central portion in the main-scan direction is taken on the axis of ordinate.

Hence, in order to reduce the quantity of wavefront aberration to a level allowable from the design, it is necessary to precisely control the tilt component (tilt angle) a (deg.) of the focal line 510 as well. The value thereof should preferably be 1 deg. or less.

More specifically, when the angle defined between the focal line direction of the light beam and the main-scan direction (Y-direction) passing through the center of the deflecting surface 501a is denoted by α, in the present embodiment the following condition is satisfied.

$$|\alpha| \leq 1 \text{ (deg.)} \quad (1)$$

With this arrangement, the quantity of wavefront aberration is kept in the range allowed with respect to the design.

More preferably, the above conditional expression (1) had better be set as follows.

$$|\alpha| \leq 0.2 \text{ (deg.)} \quad (2)$$

It should be noted that, although the imaging optical system LB is constituted by a single lens in the present embodiment, the invention is not limited to this. It may be constituted by two ore more pieces of lenses. Furthermore, the imaging optical system LB may include a diffractive optical element.

Embodiment 2

Figure 12:
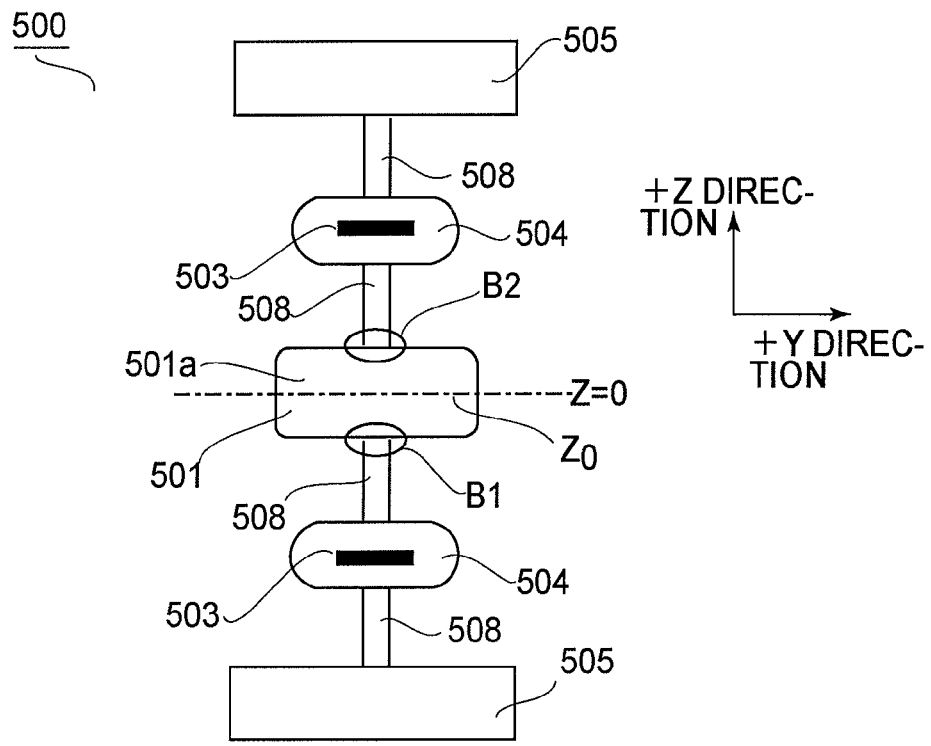
FIG. 12 is a schematic diagram of a main portion of an optical deflector of resonance type, according to a second embodiment of the present invention.

FIG. 12 is a schematic diagram of a main portion of a resonance type optical deflector according to a second embodiment of the present invention.

In FIG. 12, like numerals are assigned to components corresponding to those of FIG. 9.

The present embodiment differs from the abovementioned first embodiment in that both sides of the first movable plate 501 in the sub-scan direction (Z-direction) are supported by torsion springs 508 and that second movable plates 504 are provided at both sides of the first movable plate 501 in the sub-scan direction.

Other structures and the optical function are similar to those of the first embodiment, and based on this, similar advantageous effects are obtainable.

Denoted in FIG. 12 at 500 is an optical deflector of resonance type as deflecting means, and it comprises a galvanometer mirror (oscillating mirror).

Even in the case of present embodiment, like the first embodiment, based on driving while a frequency twofold the reference frequency is superimposed on the reference frequency, scanning deflection of a wider constant angular-speed region is achieved as compared with sinusoidal vibration type.

Figure 13:
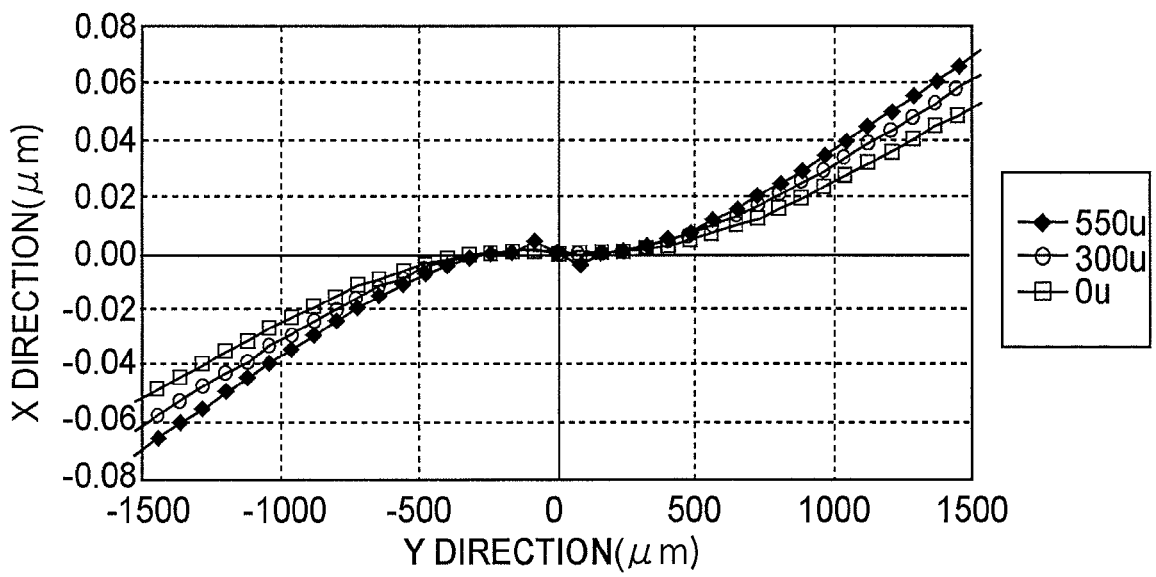
FIG. 13 is a graph showing surface-deformation simulation values of the resonance type optical deflector according to the second embodiment of the present invention.
Figure 14:
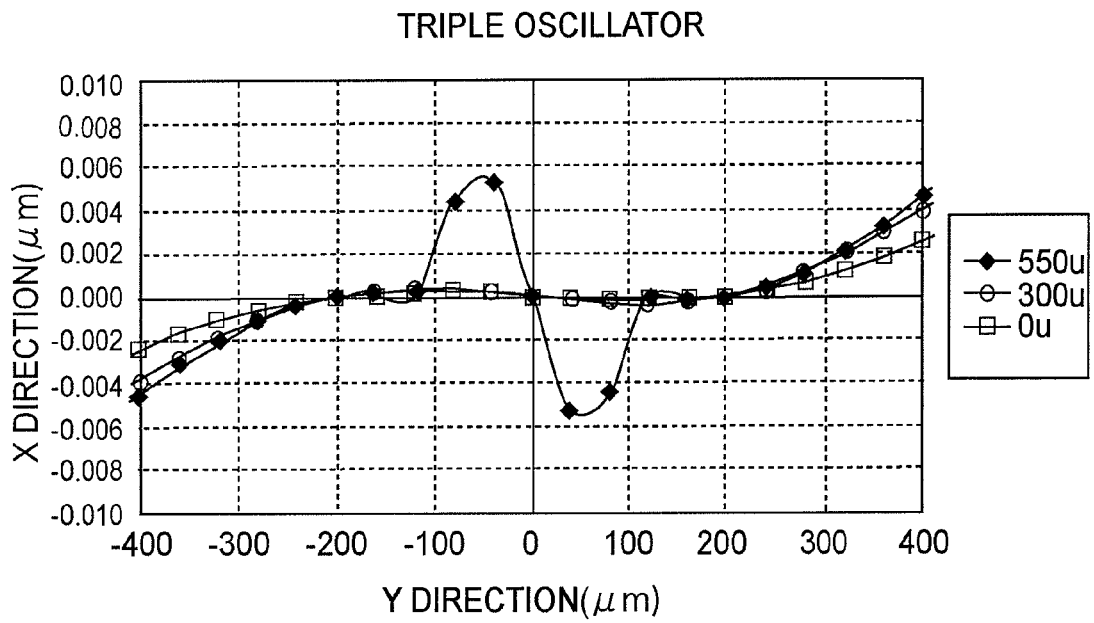
FIG. 14 is a graph enlarged in scale, showing surface-deformation simulation values of the resonance type optical deflector according to the second embodiment of the present invention.

FIG. 13 is a graph showing the amount of surface deformation (quantity of dynamic flexure) of the deflecting surface 501a in the state where the image end portion is being scanned, when the oscillation the same as that of the first embodiment is carried out. The surface deformation was calculated based on the finite element method. FIG. 14 is an enlarged view of the central part of the graph illustrated in FIG. 13.

This graph was prepared by detecting the surface deformations at certain heights of the deflecting surface 501a and by removing surface tilt components, at respective heights, at the central portion in the main-scan direction.

It is seen from this graph that the deformation amount differs largely from position to position in the Z-direction (sub-scan direction).

Since the resonance type optical deflector 500 used in the present embodiment has a vertically symmetry shape with respect to the central line Z0, only the data concerning the upper side of the first movable plate 501 is plotted in the graph.

It is seen from this graph that local deformation occurs in the contact portion (regions B1 and B2 shown in FIG. 12) with the torsion spring 508.

If the light beam is reflected by the portion where there is such a local surface deformation, the spot to be imaged on the photosensitive drum surface 8 will be deformed largely, and thus high-quality image formation will be difficult to attain.

With regard to optical scanning devices with a resonance type optical deflector 5 having been previously proposed, there has been no discussion about which position on the deflecting surface 501a the light beam should be reflected.

In the present embodiment, the focal line had better be defined while avoiding the region where local deformation occurs.

Figure 15:
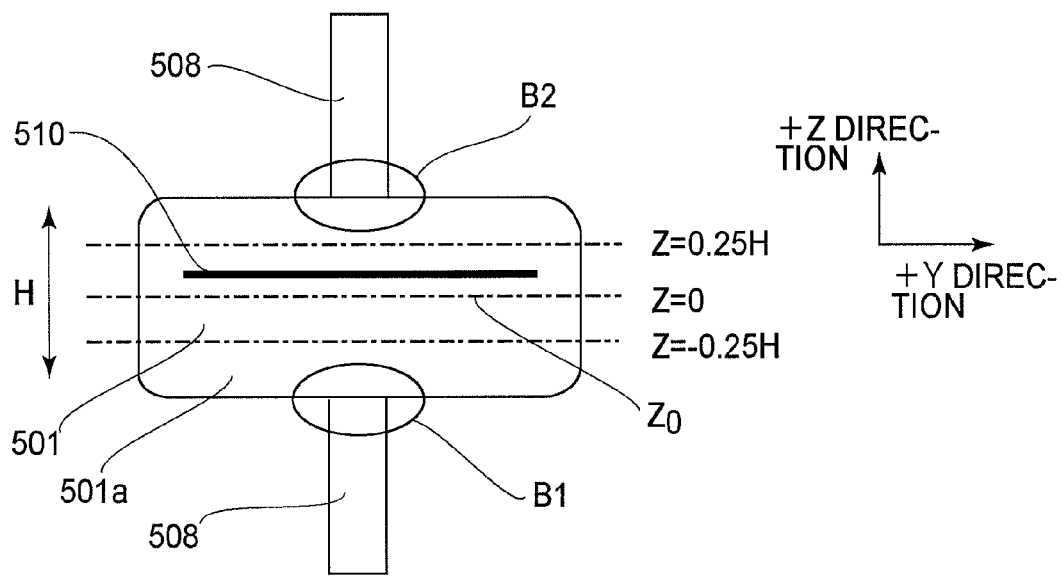
FIG. 15 is a diagram for explaining the positional relationship between the deflecting surface and the focal line, in the second embodiment of the present invention.

As shown in FIG. 15, when the height direction (sub-scan direction) of the first movable plate 501 is denoted by H (μm), it is desirable to set the initial focal line position within the range of 0.25×H from the central line Z0, while taking into account the possibility that the position of the focal line 510 shifts relative to the central line Z0 upwardly or downwardly due to any environmental variation.

More particularly, when the width of the deflecting surface 501a in the sub-scan direction is denoted by H (μm), the condensing optical system LA collects the light beam from the light source means 1 in the range of the deflecting surface 501a, specifically, to the region of the deflecting surface 501a which region is within a range of 0.25×H in the sub-scan direction from a central line Z0 of the deflecting surface with respect to the sub-scan direction.

With this arrangement, deterioration of the wavefront aberration (comatic aberration) of the light beam reflected by the deflecting surface 501a is prevented.

More preferably, the light beam emitted from the light source means 1 had better be condensed into the region in the range of 0.1×H µm in the sub-scan direction, from the central line Z0 in the sub-scan direction.

Figure 16:
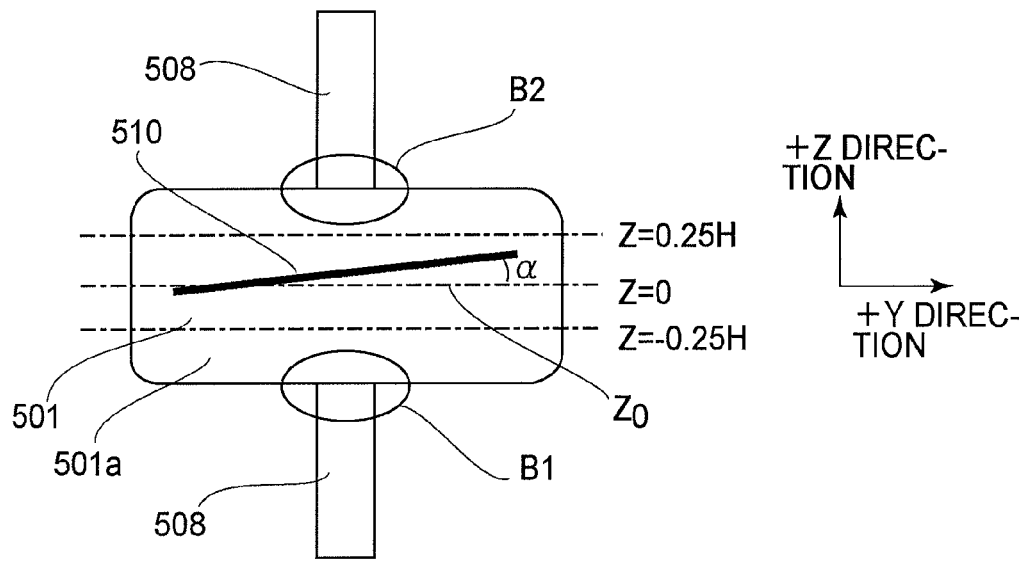
FIG. 16 is a diagram for explaining the relationship between the deflecting surface and the tilt of the focal line, in the second embodiment of the present invention.

Furthermore, as has been described with reference to the first embodiment, if the focal line 510 tilts in the sub-scan direction as shown in FIG. 16, the surface deformation shown in FIG. 13 and FIG. 14 should preferably be considered while taking into account the difference of tilt component at the central portion in the main-scan direction.

In the second embodiment as well, the value of tilt component (tilt angle) α of the focal line 510 should preferably be set to 1 deg. or less.

Embodiment 3

Figure 17:
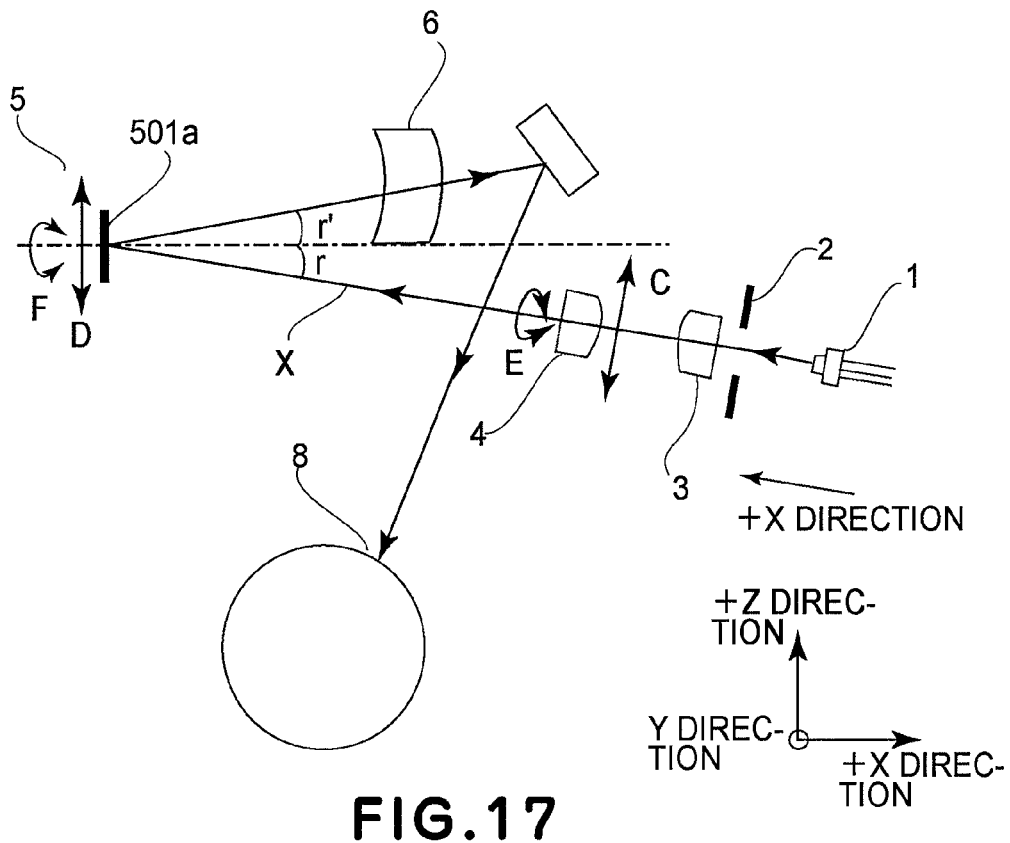
FIG. 17 is a sub-scan sectional view of an optical scanning device, which explains a third embodiment of the present invention.

FIG. 17 is a sectional view (sub-scan sectional view) in the sub-scan direction of a main portion, for explaining the method of adjusting the focal line position in a third embodiment of the present invention.

In FIG. 17, like numerals are assigned to components corresponding to those of FIG. 1.

In the foregoing description of the first and second embodiment, the large influence of the positional relationship between the deflecting surface 501a and the focal line 510 on the imaging performance has been explained.

Here, the adjusting means for shifting the position of the focal line 510 on the deflecting surface 501a toward its design position will be explained.

In the present embodiment, the focal line 510 can be shifted to a particular position by moving the cylindrical lens 4 shown FIG. 17 in the direction of an arrow C (sub-scan direction).

Furthermore, the focal line 510 can be shifted to a particular position even by moving the resonance type optical deflector 5 itself in the direction of an arrow D.

It should be noted that the adjustment may be made by relatively moving the cylindrical lens 4 and the optical deflector 5.

Furthermore, as regards the tile of the focal line 510, the focal line 510 can be shifted to a particular position even by rotating the cylindrical lens 4 n the direction of an arrow E around the optical axis X.

Furthermore, the focal line 510 can be shifted to a particular position even by rotating the resonance type optical deflector itself in the direction of an arrow F shown in the drawing.

It should be noted that the adjustment may be made by relatively rotating the cylindrical lens 4 and the optical deflector 5.

By coordinating the positional relationship between the focal line 510 and the deflecting surface 501a in accordance with any of these adjusting methods, deterioration of the wavefront aberration due to the surface deformation, as has been described with reference to the first and second embodiments, can be reduced.

[Embodiment of Image Forming Apparatus]

Figure 18:
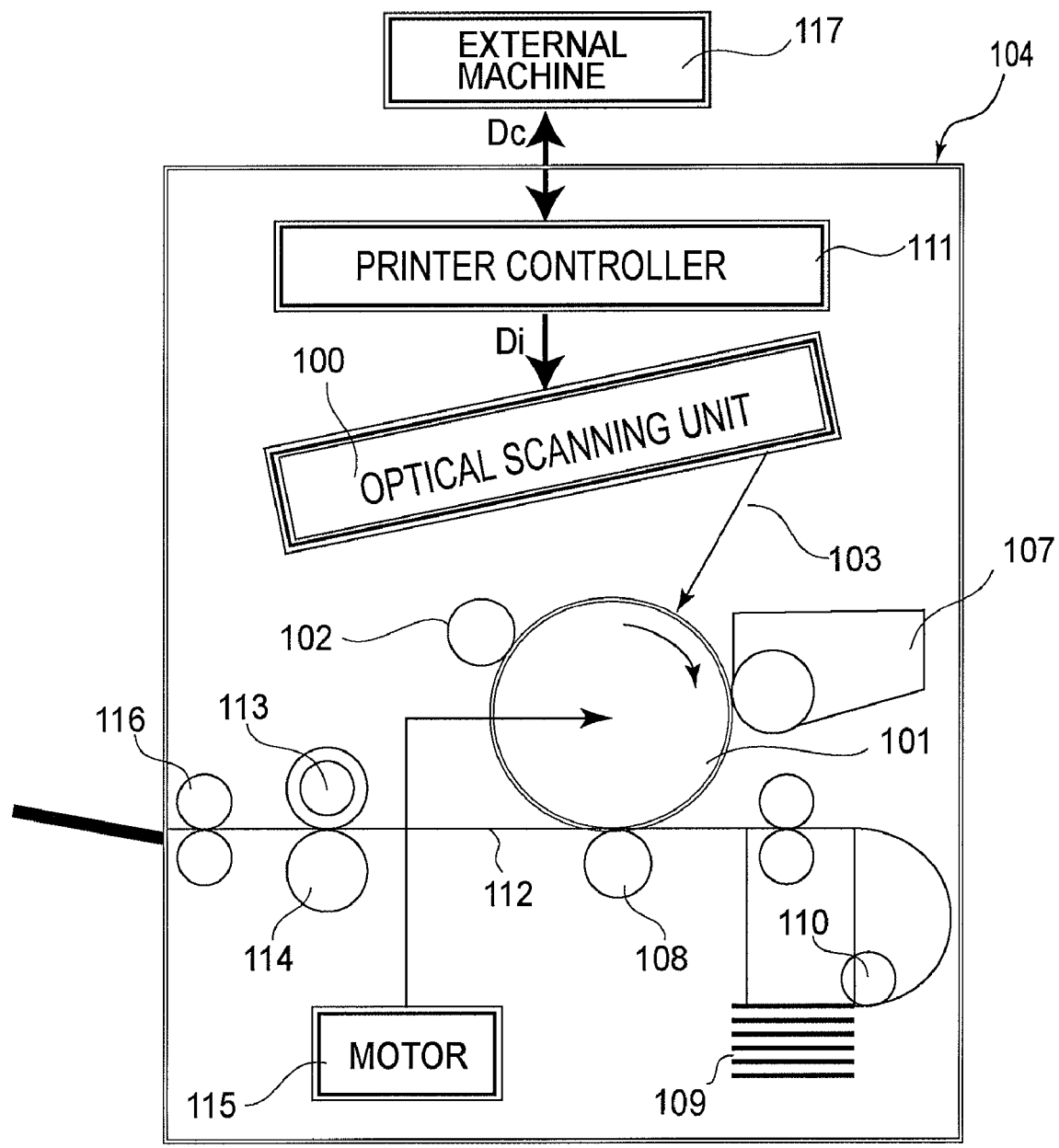
FIG. 18 is a sub-scan sectional view, showing an embodiment of an image forming apparatus according to the present invention.

FIG. 18 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 15) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 15) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 18, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

[Embodiment of Color Image Forming Apparatus]

Figure 19:
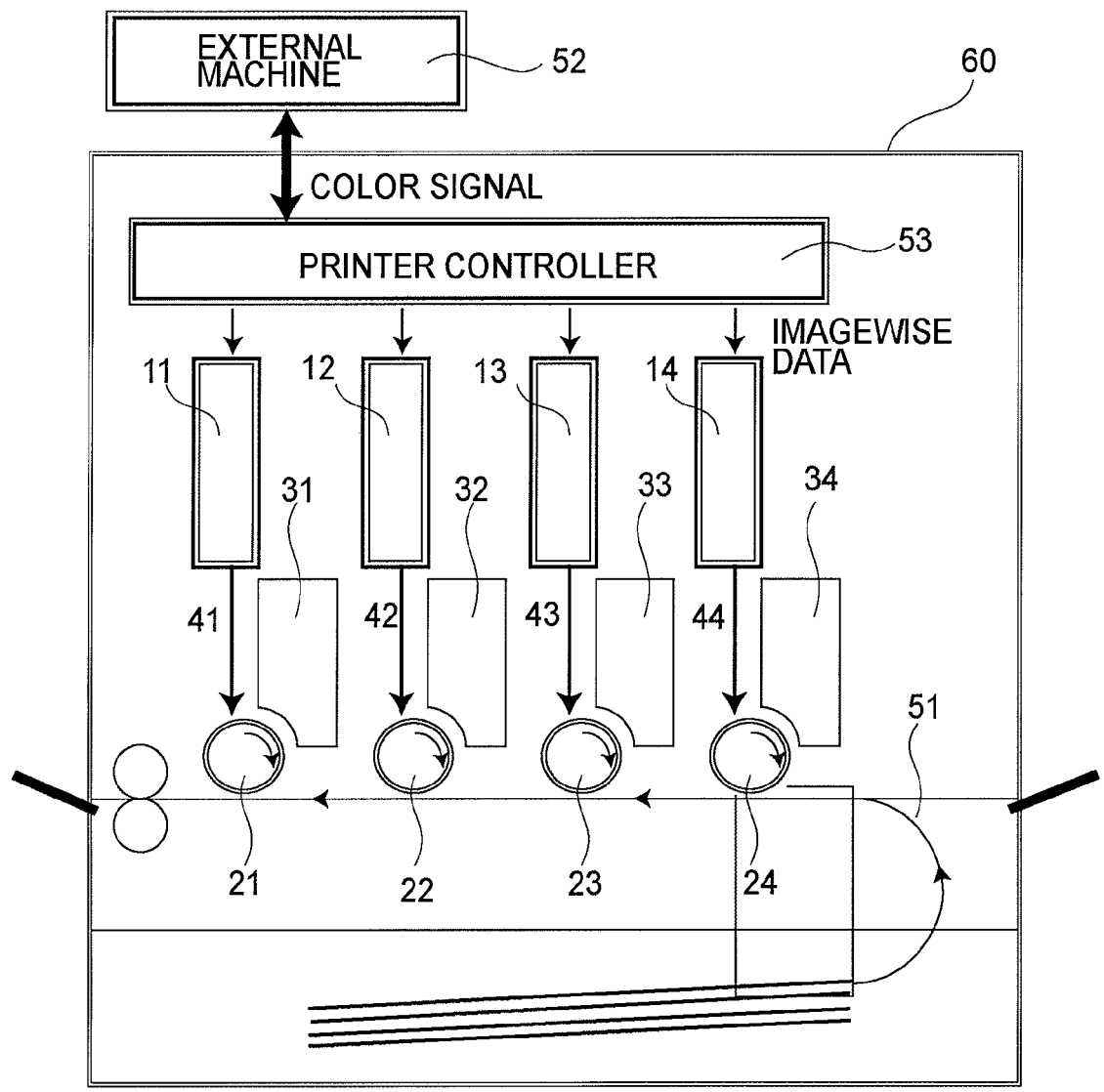
FIG. 19 is a schematic diagram of a main portion of a color image forming apparatus according to an embodiment of the present invention.
Figure 20:
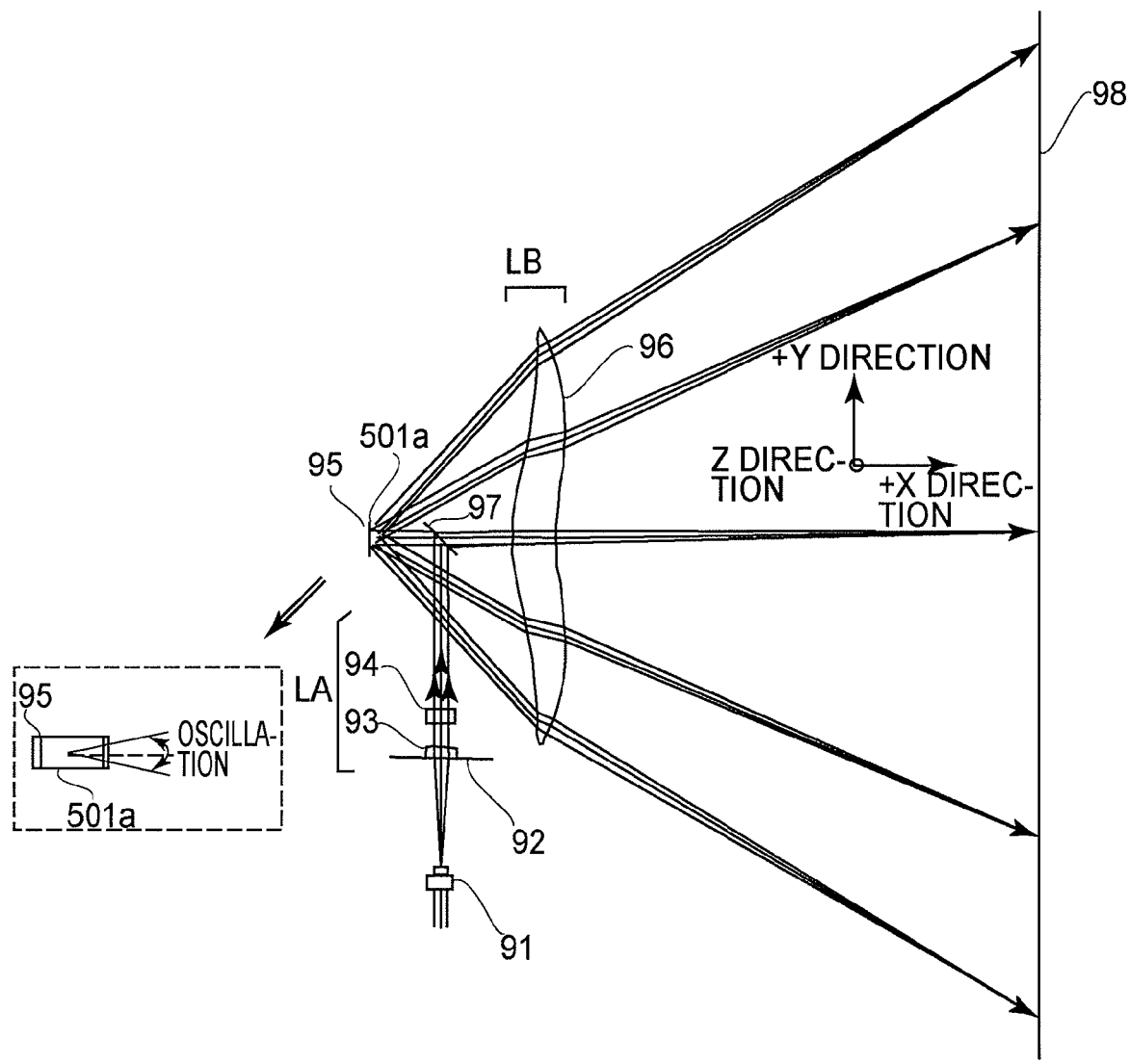
FIG. 20 is a main-scan sectional view of a conventional optical scanning device.
Figure 21:
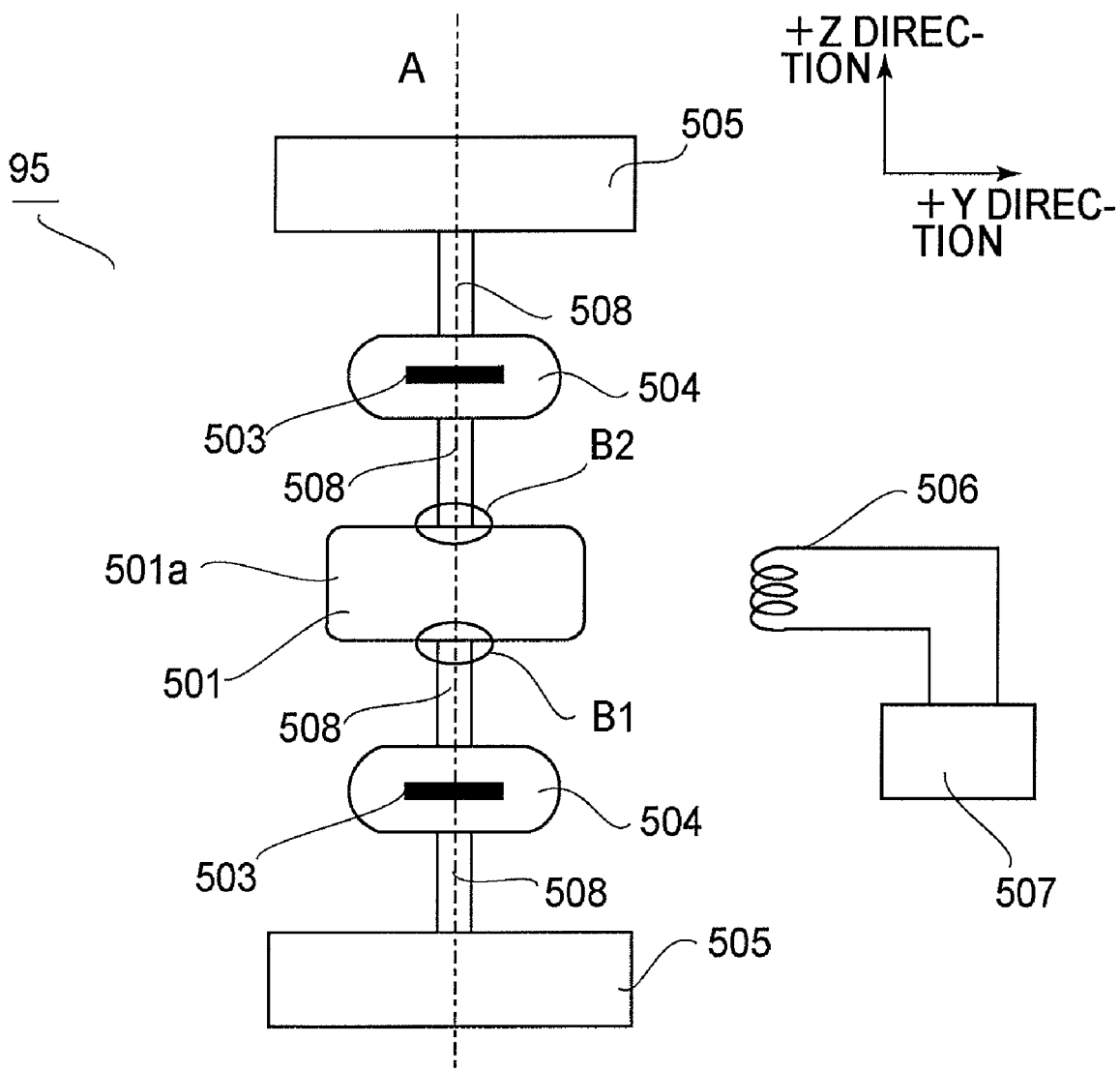
FIG. 21 is a schematic diagram of a main portion of a conventional optical deflector of resonance type.

FIG. 19 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 19, denoted generally at 60 is a color image forming apparatus, and denoted at 11, 12, 13 and 14 are optical scanning devices having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

Although not shown in FIG. 19, the image forming apparatus further comprises a transfer device for transferring the toner image developed by the developing device to a transfer material, and a fixing device for fixing the transferred toner image on the transfer sheet.

In FIG. 19, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and B (black).

These imagewise data are inputted into the optical scanning devices 11, 12, 13 and 14, respectively. In response, these optical scanning devices produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, four optical scanning devices 11, 12, 13 and 14 are provided and these correspond to colors of C (cyan), M (magenta), Y (yellow) and B (black), respectively. These scanning devices are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning devices 11, 12, 13 and 14 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-033462 filed Feb. 14, 2007, for which is hereby incorporated by reference.

What is claimed is:

1. An optical scanning device, comprising:
a condensing optical system configured to collect a light beam emitted from light source means;
deflecting means configured to scanningly deflect the light beam collected by said condensing optical system; and
an imaging optical system configured to image the light beam scanningly deflected by said deflecting means, on a surface to be scanned;
wherein said deflecting means has a deflecting surface configured to reciprocally move within a main-scan sectional plane and to scanningly deflect the light beam from said condensing optical system,
wherein said deflecting surface of said deflecting means is supported by a supporting means only at one side in the sub-scan direction, and wherein the light beam collected by said condensing optical system is collected to a region of said deflecting surface at a side of a central line of said deflecting surface in the sub-scan direction which side is opposite to the side where said deflecting surface is supported by said supporting means.

2. An optical scanning device according to claim 1, wherein said condensing optical system is configured to collect the light beam from said light source means to form a focal line on said deflecting surface, and wherein, when an angle defined between a direction of the focal line of the light beam and a main-scan direction passing through a center of said deflecting surface is denoted by α (deg.), a relation $$|\alpha| \leq 1 \text{ (deg.)}$$

is satisfied.

3. An optical scanning device according to claim 1, wherein the light beam collected by said condensing optical system, when the same is projected in the main-scan sectional plane, is incident on said deflecting surface from an optical axis direction of said imaging optical system, and wherein the light beam collected by said condensing optical system is incident obliquely relative to an optical axis of said imaging optical system.

4. An optical scanning device according to claim 1, wherein said deflecting means includes a movable plate having said deflecting surface, and wherein said movable plate has a thickness not less than 100 μm and not greater than 500 μm.

5. An optical scanning device according to claim 1, wherein said deflecting surface of said deflecting means is driven while a frequency n-fold a reference frequency is superimposed on the reference frequency, where n is an integer.

6. An image forming apparatus, comprising:
an optical scanning device as recited in claim 1;
a photosensitive member disposed at a surface to be scanned;
a developing device for developing an electrostatic latent image formed on said photosensitive member with a light beam scanningly deflected by said optical scanning device, to produce a toner image;
a transferring device for transferring the developed toner image onto a transfer material; and
a fixing device for fixing the transferred toner image, on the transfer material.

7. An image forming apparatus, comprising:
an optical scanning device as recited in claim 1; and
a printer controller for converting code data supplied from an outside machine into an imagewise signal and for inputting the imagewise signal into said optical scanning device.

* * * * *